(12) United States Patent
Schneider

(10) Patent No.: US 7,807,937 B2
(45) Date of Patent: *Oct. 5, 2010

(54) METHOD AND SYSTEM OF CONSERVING PLASMA TORCH CONSUMABLE

(75) Inventor: Joseph C Schneider, Menasha, WI (US)

(73) Assignee: Illinois Tool Works Inc., Glenview, IL (US)

(*) Notice: Subject to any disclaimer, the term of this patent is extended or adjusted under 35 U.S.C. 154(b) by 930 days.

This patent is subject to a terminal disclaimer.

(21) Appl. No.: 10/905,420

(22) Filed: Jan. 3, 2005

(65) Prior Publication Data

US 2006/0151446 A1    Jul. 13, 2006

(51) Int. Cl.
B23K 10/00    (2006.01)

(52) U.S. Cl. .......................... 219/121.54; 219/121.57; 219/121.59; 219/121.53; 219/121.39; 219/121.45

(58) Field of Classification Search .......... 219/121.54, 219/121.55, 121.57, 121.5, 121.51, 121.52, 219/75, 121.39, 124
See application file for complete search history.

(56) References Cited

U.S. PATENT DOCUMENTS

| | | | | |
|---|---|---|---|---|
| 3,646,311 A | * | 2/1972 | Cameron et al. | 219/137 R |
| 5,528,010 A | * | 6/1996 | Herwig et al. | 219/76.16 |
| 5,620,617 A | * | 4/1997 | Borowy et al. | 219/121.54 |
| 5,660,745 A | * | 8/1997 | Naor | 219/121.57 |
| 5,828,030 A | * | 10/1998 | Naor | 219/121.57 |
| 5,831,237 A | * | 11/1998 | Daniel | 219/121.54 |
| 5,866,869 A | * | 2/1999 | Schneider et al. | 219/121.39 |
| 5,938,919 A | * | 8/1999 | Najafabadi | 210/198.2 |
| 6,677,551 B2 | * | 1/2004 | Hardwick | 219/121.54 |
| 6,794,601 B2 | * | 9/2004 | Norris et al. | 219/121.57 |
| 2001/0042736 A1 | * | 11/2001 | Schneider et al. | 219/121.55 |
| 2005/0045599 A1 | * | 3/2005 | Matus | 219/121.39 |
| 2005/0077273 A1 | * | 4/2005 | Matus et al. | 219/121.54 |

FOREIGN PATENT DOCUMENTS

| DE | 265779 A | * | 3/1989 |
|---|---|---|---|
| EP | 213689 A2 | * | 3/1987 |

* cited by examiner

Primary Examiner—Stephen J Ralis
(74) Attorney, Agent, or Firm—Fletcher Yoder P.C.

(57) ABSTRACT

A system for conserving a consumable component of a plasma torch is disclosed. The system includes a controller of a plasma torch that is connected to a power source. The controller is configured to, during a single trigger actuation, delay generation of an arc after a prior arc collapses. Such a control allows the consumable components of the plasma torch to cool prior to subsequent operation.

19 Claims, 3 Drawing Sheets

METHOD AND SYSTEM OF CONSERVING PLASMA TORCH CONSUMABLE

BACKGROUND OF THE INVENTION

The present invention relates generally to plasma cutting systems and, more particularly, to a controller for use with such systems.

Plasma cutting is a process in which an electric arc is used for cutting a workpiece. Plasma cutters typically include a power source, an air supply, and a torch. The torch, or plasma torch, is used to create and maintain the plasma arc that performs the cutting. A plasma cutting power source receives an input voltage from a transmission power receptacle or generator and provides output power to a pair of output terminals, one of which is connected to an electrode and the other of which is connected to the workpiece. An air supply is used with most plasma cutters to carry and propel the arc to the workpiece and help cool the torch.

There are multiple ways of initiating this cutting process, for example contact starting or high frequency or high voltage starting. Generally, in contact start plasma cutters, a movable or fixed electrode or consumable serves as a cathode and a fixed or movable nozzle or tip serves as an anode. In some units, the air supply is used to force a separation of the electrode and tip to create an initial or pilot arc. In others, mechanical or electromechanical means serve to separate the contacts and generate the pilot arc. In either case, once the pilot arc is established, air is forced past the pilot arc whereby it is heated and ionized to form a plasma jet that is forced out of the torch through the opening in the nozzle. The air aids in extending the arc to the workpiece forming a cutting arc and initiating the cutting process.

Both the pilot arc and the cutting arc are electrically supported by the electrode of the plasma torch. Due to the considerable heat and power concentration associated with the plasma cutting arc, the electrode commonly includes an insert supported in a body of the electrode. This insert, as compared to the body of the electrode, is generally formed of a material that is more impervious to wear associated with supporting the arc. The material of the insert is generally hafnium or zirconium based and can support repeated pilot and cutting arc generation and support. Although the insert is better equipped to support the plasma arc than the body of the electrode, it is still susceptible to wear.

During a cutting process, the cutting arc swirls about an end of the insert. The end of the insert liquefies due to the current and temperature associated with supporting the arc. After completion of a cutting process, the arc collapses and the movable contacts of the plasma torch must return to an idle position in preparation of a subsequent arc demand. To achieve the idle position, the movable contacts must come into contact or engage one another. Moving the contacts of the plasma torch from a separated or operating position to a contacting idle position results in an impact between the parts as they engage one another. This impact dislodges a portion of the liquefied material of the insert and expedites wear of the insert.

Additionally, during operation of the plasma torch, gas passes through the torch. A portion of this gas is converted to plasma to effectuate the plasma cutting process and another portion of the gas can be used to shield the plasma cutting process from surrounding conditions and to cool the components of the plasma torch. Upon completion of a cutting process, when the cutting arc collapses, the flow of gas through the plasma torch is also disrupted. The disruption of the gas flow through the plasma torch creates a pressure differential within the torch. This pressure differential within the torch also detrimentally affects retention of the liquefied portion of the insert. That is, the relatively sudden pressure change effectively sucks or blows a portion of the liquefied material from the insert. The sudden pressure change and the mechanical movement of the components of the plasma torch, individually and in combination, shorten the life cycle of the insert by removing that portion of the insert liquefied during a cutting process. Such operation increases consumable component consumption resulting in increased cost and decreased operational efficiency.

It would, therefore, be desirable to design a plasma cutting system that controls the plasma torch to allow solidification of the portion of the electrode insert liquefied during a plasma cutting operation.

BRIEF DESCRIPTION OF THE INVENTION

The present invention provides a system and controller that overcomes the aforementioned drawbacks. The controller is configured to control a plasma cutting system to reduce the wear of the consumable components of the plasma torch. The controller, during a single trigger activation, maintains a delay between the collapse of an arc and the generation of a subsequent arc. Such a control allows the components of the consumable assembly to cool thereby reducing wear of the components associated with generation of the subsequent arc.

Therefore, in accordance with one aspect of the present invention, a welding-type system is disclosed having a plasma torch controlled by a trigger and constructed to generate an arc. An air supply is connected to the plasma torch and is constructed to deliver an air flow thereto. The system includes a controller configured to control the air supply, monitor actuation of the trigger, and continuously monitor for arc outage. If the controller detects an arc outage while the trigger is actuated, the controller continues the air flow for a predetermined period and then regenerates a pilot arc in the plasma torch.

According to another aspect of the present invention, a plasma cutting system having a power source connected to a plasma torch is disclosed. The power source is constructed to generate a plasma cutting power. The plasma cutting system includes a controller configured to control the plasma torch to generate a first arc upon actuation of a trigger and generate a second arc after extinction of the first arc when the trigger remains actuated but only after a consumable component of the plasma torch returns to an approximate pre-arc condition.

According to a further aspect of the present invention, a controller of a plasma torch system is disclosed. The controller is configured to monitor a condition of an arc of a plasma torch and, if the arc collapses and a trigger of the plasma torch system remains activated, initiate a delay prior to automatic generation of a subsequent arc.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
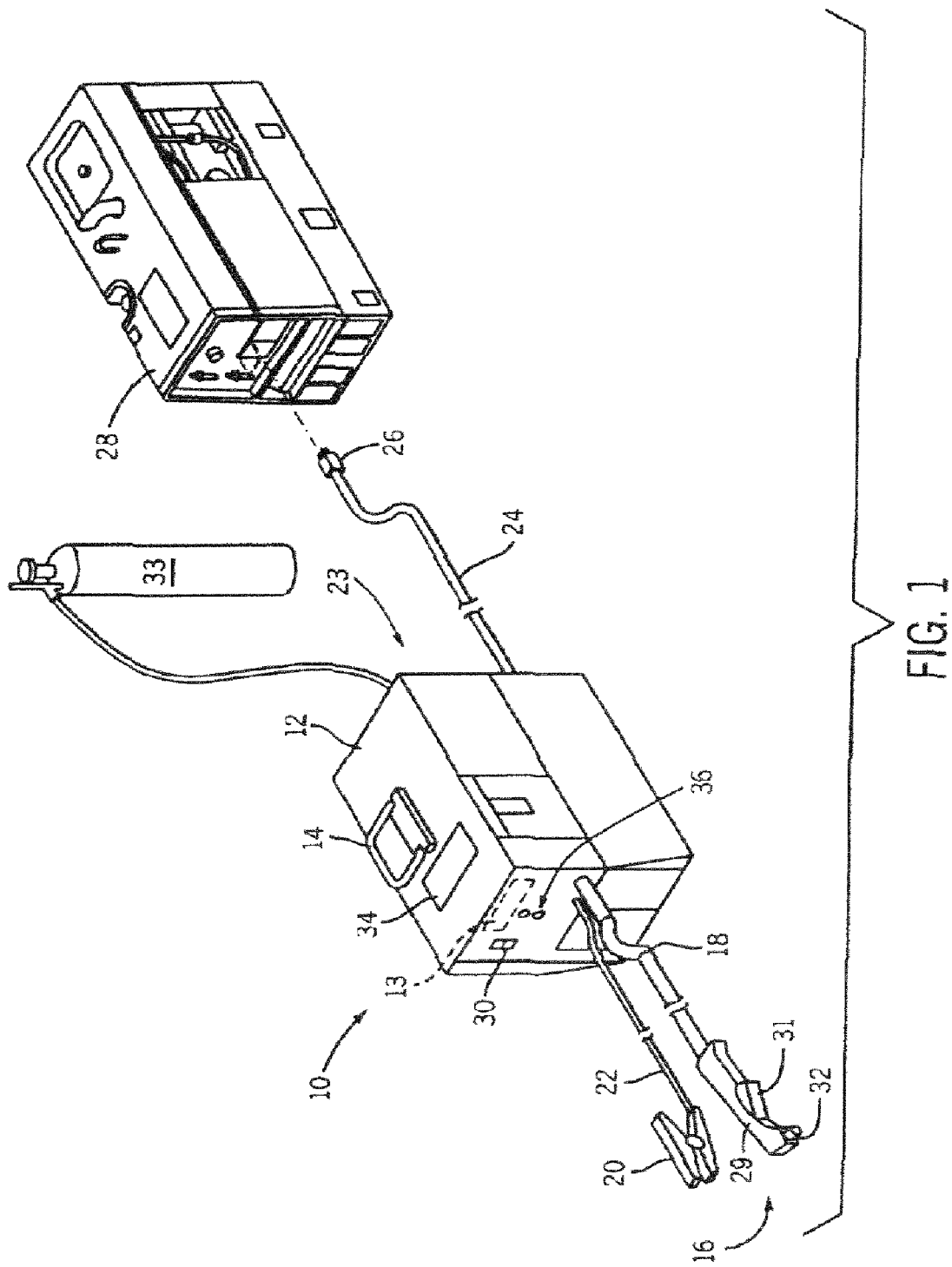
FIG. 1 is a perspective view of a plasma cutting system incorporating the present invention.

FIG. 1 shows a plasma cutting system 10 according to the present invention. Plasma cutting system 10 is a high voltage system with open circuit output voltages that typically range from approximately 230 Volts Direct Current (VDC) to over 300 VDC. Plasma cutting system 10 includes a power source 12 to condition raw power and generate a power signal suitable for plasma cutting applications. Power source 12 includes a processor 13 that receives operational feedback and monitors the operation of a plasma cutting system 10. Power source 12 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it understood and within the scope of the claims that trigger 31 be connected to power source 12 or otherwise remotely positioned relative to torch 16.

Also connected to power source 12 is a work clamp 20 which is designed to connect to a workpiece (not shown) to be cut and provide a grounding or return path. Connecting work clamp 20 to power source 12 is a cable 22 designed to provide the return path, or grounding path, for the cutting current from torch 16 through the workpiece and work clamp 20. Extending from a rear portion 23 of power source 12 is a power cable 24 having a plug 26 for connecting power source 12 to either a portable power supply 28 or a transmission line power receptacle (not shown). Power source 12 includes an ON/OFF switch 30 and may also include amperage and air pressure regulation controls, indicator lights, and a pressure gauge 36.

To effectuate cutting, torch 16 is placed in close proximity to the workpiece connected to clamp 20. A user then activates trigger 31 on torch 16 to deliver electrical power and compressed air to work tip 32 of torch 16 to initiate a pilot arc and plasma jet. Shortly thereafter, a cutting arc is generated as the user moves the torch to the workpiece. The arc transfers from the electrode to the workpiece through the tip. The user may then cut the workpiece by moving torch 16 across the workpiece. The user may adjust the speed of the cut to reduce spark splatter and provide a more-penetrating cut by adjusting amperage and/or air pressure. Gas is supplied to torch 16 from a pressurized gas source 33, from an internal air compressor, or an external air compressor.

Figure 2:
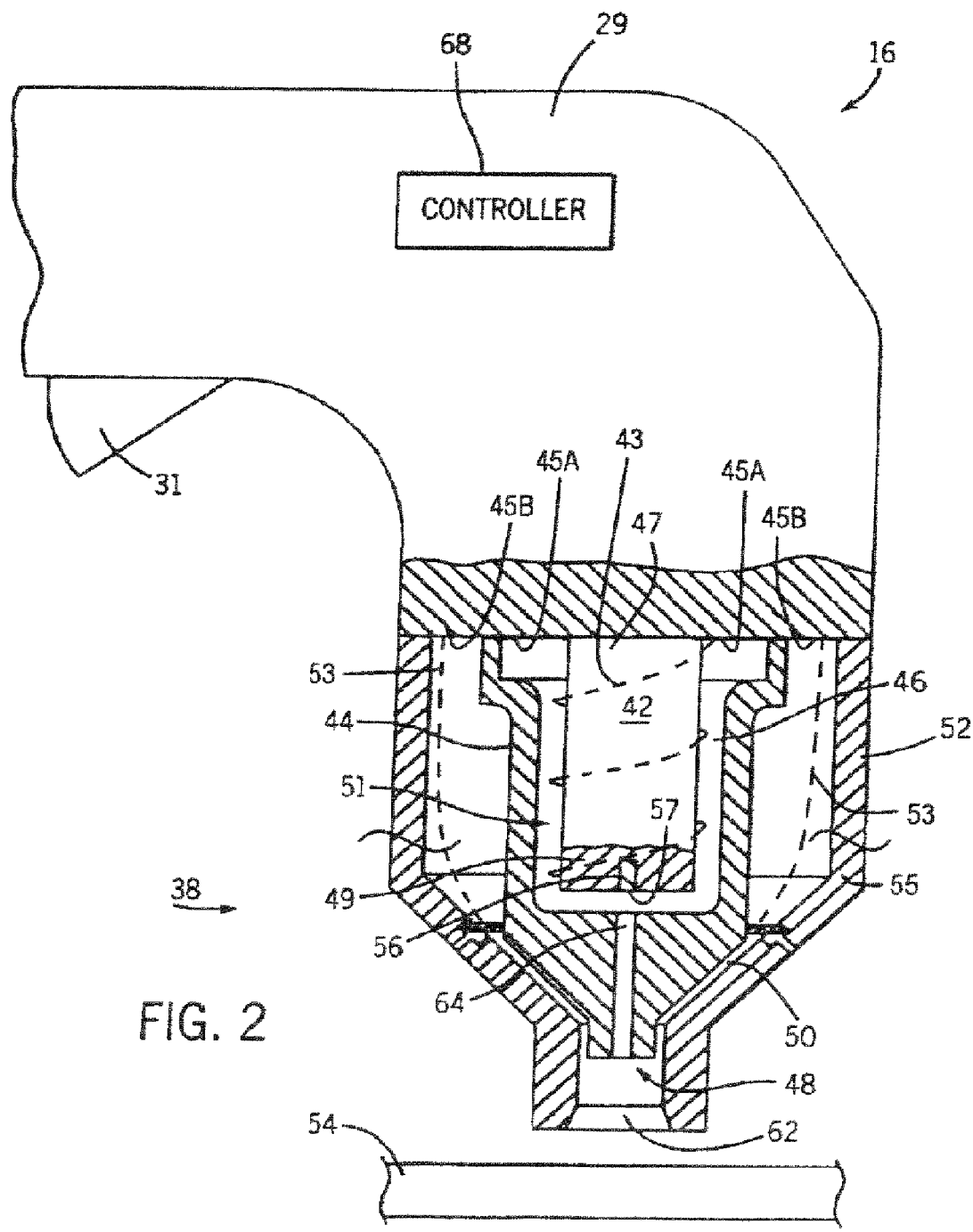
FIG. 2 is a partial cross-sectional view of the torch assembly shown in FIG. 1.

Referring now to FIG. 2, a consumable assembly 38 of plasma cutting torch 16 is shown in partial cross-section. Consumable assembly 38 is attached to handle portion 29 of torch 16 and includes a cathodic component, or electrode 42, and an anodic component, or tip 44. Electrode 42 is centrally disposed within a gas chamber 46 and has a base 47 that electronically communicates with power source 12 through handle portion 29 of torch 16. Electrode 42 includes an electrode tip 49 at an opposite end 51 from base 47 of electrode 42. A plasma forming gas 43 is passed through a swirl ring (not shown) and delivered to gas chamber 46 from a plurality of passages 45A. Gas 43 exits gas chamber 46 through an end portion 48 of tip 44. Another plurality of gas passages 45B deliver a shielding gas 53 to a shielding gas passage 50 extending between tip 44 and a cup or cap 52 and a shield 55 connected to cap 52 of consumable assembly 38.

During a cutting process, a plasma jet passes from torch 16 through end portion 48 of tip 44 and exits torch 16 through a tapered opening 62 of shield 55. A flow of shielding gas also exits torch 16 through opening 62 of shield 55 and generally encompasses the plasma jet. End portion 48 of tip 44 and opening 62 cooperate to direct the plasma flow from a plasma chamber 64 into a concentrated, highly charged, plasma flow. Plasma chamber 64 is formed in the space between electrode 42 and end portion 48 of tip 44.

A pilot arc is generally formed in plasma chamber 64 between electrode 42 and tip 44, collectively known as the contacts. The flow of gas through the torch is converted to a plasma jet initiated by the pilot arc. As shown, electrode 42 is movable relative to tip 44 such that electrode 42 is in contact with tip 44 during an idle or non-operating mode of plasma torch 16. Actuation of trigger 31 initiates a current and an air flow. The air flow separates electrode 42 and tip 44 and cooperates with the current to form the pilot arc between electrode 42 and tip 44. Gas 43 passing from gas chamber 46 directs the pilot arc through nozzle portion 48 of tip 44 and opening 62 of shield 55 toward a workpiece 54.

It is understood and within the scope of the appending claims that the torch could be constructed to form the pilot arc through contact/separation of components other than those shown. For example, the plasma torch could generate the pilot arc through contact/separation between any combination of an electrode, a tip, a nozzle, a swirl ring, or a portion of the cap. It is further understood that rather than being a "contact start" torch, the present claims are equally applicable to what are commonly referred to as high frequency and/or high voltage starting torches.

During a cutting operation, the cutting arc initiated from the pilot arc is maintained between workpiece 54 and an insert 56 of electrode 42. The cutting arc swirls about an end 57 of insert 56 and travels to workpiece 54 in the plasma flow from torch 16. Insert 56 is constructed to be conductive and to resist deterioration associated with the high temperature and power of the arc which swirls thereabout. Insert 56 exhibits certain preferred electrical, thermal, and chemical properties and is preferably formed of a hafnium or a zirconium based material.

Although insert 56 is highly conductive and is constructed to resist deterioration or wear associated with having an end of a plasma arc swirl thereabout, insert 56 is not unsusceptible to wear. During a plasma cutting process, end 57 of insert 56 is subjected to current and temperature conditions that liquefy end 57 of insert 56. Although liquefied, the liquid portion of the insert remains connected to insert 56. After an arc collapses, the contacts need to re-establish contact in order to generate a subsequent arc. Suspending air flow through the torch allows the contacts to engage one another. If the contacts initiate contact too soon after arc extinguination, there are several aspects that detrimentally affect the insert wear.

As one aspect, turning off the air to allow the contacts to reinitiate contact hinders the cooling of the components of the plasma torch including the insert of the electrode thereby requiring longer for the liquefied portion of the insert to solidify. In a second aspect, the pressure change associated with turning off the air flowing through the torch may cause a portion of the liquefied material from insert 56 to be sucked or blown from insert 56. A third aspect of the detrimental affect on insert wear associated with immediate arc re-establishment is the mechanical forces associated with the contacts closing/opening. The motion of the contacts can result in a portion of insert 56 becoming dislodged or flicked from insert 56. As will be discussed further below with respect to FIG. 3, a delay is initiated prior to a subsequent arc generation after an arc collapses and while the trigger remains actuated to allow the liquefied material of the insert to solidify. Such a controlled delay reduces insert wear associated with arc generation after an arc out condition.

Plasma torch 16 includes a controller 68 configured to control an operating mode of plasma torch 16. Although shown as integrated into torch 16, it is understood that controller 68 could be connected to the cable passing between the power source and the plasma torch or preferably located in the power source. During an expanded metal operating mode, with a single actuation of trigger 31, the arc repeatedly changes between a pilot arc and a cutting arc. When torch 16 is proximate material of workpiece 54, a cutting arc is generated and when no material is proximate torch 16, torch 16 maintains a pilot arc internal to torch 16.

Figure 3:
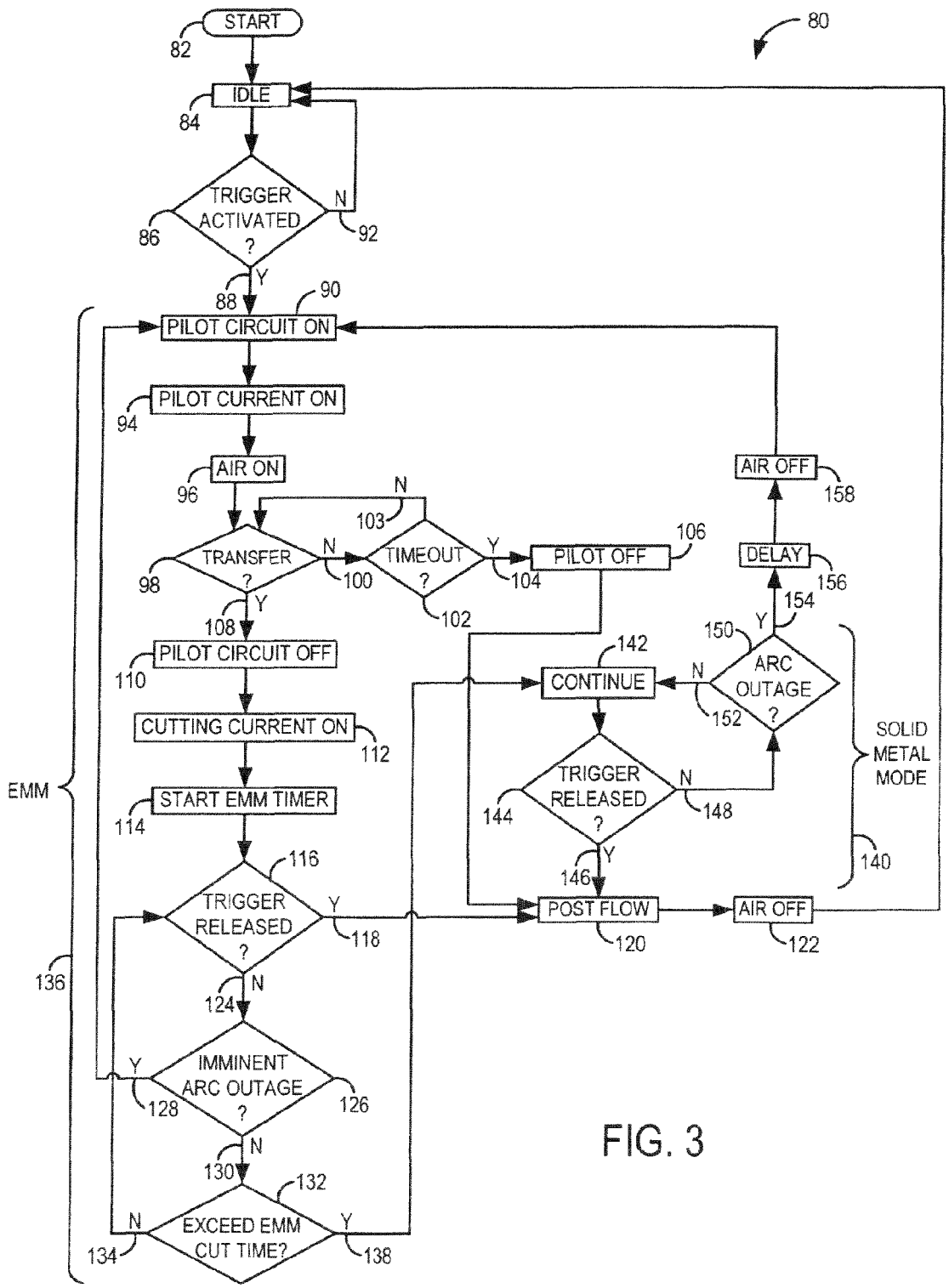
FIG. 3 shows a control technique according to which the plasma cutting system shown in FIG. 1 is operated.

FIG. 3 shows a technique 80 for operating a plasma cutting system is shown. The technique 80 starts 82 with initialization of the plasma cutting system, such as turning on the power source. With the plasma cutting system powered up, the system enters an idle mode 84. Idle mode 84 is indicative of the plasma cutting system being ready for operation, such as being turned on, but without a trigger actuation. When a trigger 86 of the plasma torch system is activated 88, the system enables a pilot arc circuit 90 such that the plasma torch can generate and support a pilot arc. While trigger 86 remains non-actuated 92, the plasma cutting system remains in idle mode 84.

With the pilot arc circuit enabled 90, a pilot arc current is delivered to the contacts of the torch 94. Pilot arc current 94 is sufficient to maintain a pilot arc and initiate a cutting arc. That is, when the torch is positioned in close proximity to a workpiece, a portion of the current of the pilot arc current is sufficient to generate an initial cutting arc between the plasma torch and the workpiece. The system monitors the condition of the pilot arc to determine when a current is present in the workpiece lead or when there is a change in the pilot arc current indicative of an arc transfer 98 to a workpiece.

The system is configured to maintain a pilot arc without a transfer 100 for a selected duration or timeout 102. If a pilot arc is maintained without transfer 100 for a duration sufficient to trigger timeout 102, the system disables the pilot circuit, turns off the pilot current, waits for the release of the trigger and goes to a post flow 120 which is discussed further below. Timeout 102 is utilized when the trigger of the torch is activated before an operator is ready to perform a plasma cutting operation. Preferably, if an operator actuates the trigger of the torch such that a pilot arc is generated and the pilot arc is not transferred to a workpiece within 3-5 seconds, the pilot arc will be extinguished and the operator will be required to re-trigger the plasma torch in order to generate a subsequent pilot arc. Alternatively, it is contemplated that the pilot arc could be maintained until a cutting arc is established.

When a pilot arc transfer has been sensed 108, pilot arc circuit 110 enabled at step 90 is then disabled and a cutting current 112 is provided to the plasma torch. It is understood that the current required to perform a cutting process is generally greater than the pilot arc current required to transfer the arc. Understandably, the transition from the pilot arc current to the cutting current is dependant on individual users and applications and can vary accordingly. That is, a particular user or application may require a more instantaneous response than other users or applications. Accordingly, it is envisioned that the transition from a pilot arc current to a cutting arc current be any of nearly instantaneous or a gradual increase or ramped response.

Once cutting current 112 has been supplied, the system initiates an expanded metal mode (EMM) timer 114. With timer 114 running, the system monitors a trigger condition 116 of the plasma torch. If the trigger is released 118 after timer 114 has been started, process 80 maintains the flow of air through the torch at post flow 120. Post flow 120 maintains the flow of gas through the torch and can allow a subsequent triggered re-start of the plasma torch before the post flow has been completed. Preferably, post flow 120 allows air to flow through the torch for 5-20 seconds after the trigger has been released. Maintaining air flow through the torch allows the torch to cool down quickly after a cutting operation. Upon completion of post flow 120, the air flow is turned off 122 thereby allowing the contacts to re-engage one another and returning the plasma torch to idle mode 84 for subsequent plasma cutting processes. These subsequent plasma cutting processes require trigger activation 88 to establish an arc.

If the trigger is not released 124, the cutting arc is monitored for an imminent arc outage 126. The imminent arc outage 126 can be determined from a change in the current of the cutting arc, resistance experienced by the cutting arc power signal, or other plasma torch operating parameters. If an imminent collapse of the cutting arc is detected 128, pilot arc circuit is enabled 90 and to allow the cutting arc to convert to a pilot arc state. By enabling the pilot arc circuit 90 prior to cutting arc collapse or outage 128, complete loss, collapse, or extinguination of the arc is averted by converting the cutting arc to the pilot arc. If an imminent arc outage is not detected 130, the system checks if timer 114 has exceeded a desired expanded metal cutting time 132. If timer 114 has not exceeded the desired expanded metal cutting time 134, the system returns to monitor the trigger position 116. Preferably, the desired EMM cutting time is approximately three seconds. That is, if a cutting arc is not maintained for at least three seconds, the system allows the cutting arc to convert to a pilot arc without reactivation of the trigger of the plasma torch. The three seconds for EMM cutting time is merely exemplary and it is understood that other durations may be desirable. Expanded metal mode 136 allows repeated conversion of an arc between a pilot arc state and a cutting arc state during a single trigger actuation 88 until a cutting arc is maintained longer than the expanded metal cutting time 138.

Alternative to automatically switching from expanded metal mode to normal cutting mode after a selected duration, the control of the mode of operation of the plasma cutting system could be controlled automatically based on a user's desired output. Because expanded metal is generally lighter gauge material which requires a lower cutting current than more substantial material, by monitoring an operator's selection of a desired output power, the controller could control the operating mode of the plasma cutting system based on a user's desired output.

After a cutting arc has been maintained longer than the desired expanded metal mode time 138 or, alternatively, if the output strays beyond a tolerance from the desired output power, the system exits expanded metal mode 136 and enters a non-expanded, or solid metal mode 140. During solid metal mode 140, the cutting arc is maintained 142 until the cut is complete, the torch is removed from the workpiece, or the trigger is released. The system monitors the trigger condition 144 and when the trigger is released 146, the process disables plasma cutting current and enters post flow 120. As previously discussed, post flow 120 continues the flow of air through the torch after the arc has collapsed and thereby cools the internal components of the torch. If the trigger is not released 148, and an arc outage has not been detected, 150, 152, the cutting arc is maintained 142 until the trigger is released 144, 146 or an arc collapse is detected 150, 154.

If the arc has collapsed 154 but the trigger has not been released 148, a controlled delay is initiated 156. During controlled delay 156, the arc current is disabled but an air flow through the torch is maintained for a selected period. Preferably, the duration of delay 156 is approximately half a second. Understandably other durations could be utilized and are contemplated. Maintaining the air flow through the plasma torch for the duration of delay 156 maintains separation of the contacts of the plasma torch. The delay in closing the contacts, in conjunction with the air flow through the torch, allows that portion of the insert liquefied during a cutting operation to solidify prior to the contacts closing. Such a construction reduces the wear experienced by the insert of the consumable electrode when the trigger has not been released after an arc collapses.

After delay 156, the air 158 through the plasma torch is turned off thereby allowing the contracts to close or return to an engaged orientation. With the trigger still depressed 154, delay 156 satisfied, and the air turned off 158, the system re-enables pilot arc circuit 90 thereby allowing the plasma torch to generate a subsequent arc.

The above-described technique 80 allows the generation of a subsequent arc after an initial arc has collapsed without trigger reactivation. Additionally, a plasma cutting system according to the present invention automatically switches operation of the plasma cutting system between an expanded metal operating mode, which allows an arc to repeatedly convert between an expanded metal mode, which switches between a pilot arc condition and a cutting arc condition, and a non-expanded or solid metal operating mode, which allows arc extinguishment, whereby no pilot or cutting arc is present, and arc establishment with a single trigger activation. Such a process automatically and non-mechanically switches the plasma cutting system between operating modes.

Additionally, when the trigger remains engaged after an arc has extinguished, indicating an operators desire to perform subsequent cutting operations, the process reduces the wear experienced by the insert of the consumable assembly by delaying reengagement of the contacts of the plasma torch. Such a configuration allows any liquefied portion of the insert to solidify prior to subsequent arc generation thereby reducing insert wear associated with movement of the contacts and subsequent arc generation.

Therefore, one embodiment of the present invention includes a welding-type system having a plasma torch controlled by a trigger and constructed to generate an arc. An air supply is connected to the plasma torch and is constructed to deliver an air flow thereto. The system includes a controller configured to control the air supply, monitor actuation of the trigger, and continuously monitor for arc outage. If the controller detects an arc outage while the trigger is actuated, the controller continues the air flow for a predetermined period and then regenerates a pilot arc in the plasma torch.

Another embodiment of the present invention includes a plasma cutting system having a power source connected to a plasma torch actuated by a trigger. The power source is constructed to generate plasma cutting power. The plasma cutting system includes a controller configured to control the plasma torch to generate a first arc upon actuation of the trigger and generate a second arc after extinction of the first arc when the trigger remains actuated but only after a consumable component of the plasma torch returns to an approximate pre-arc condition.

A further embodiment of the present invention includes a controller of a plasma torch system that is configured to monitor a condition of an arc of a plasma torch and, if the arc collapses and a trigger of the plasma torch system remains activated, initiate a delay prior to automatic generation of a subsequent arc.

As one skilled in the art will fully appreciate, the heretofore description of a plasma cutting system is one example of a plasma cutting system according to the present invention. It is understood that torches having arc starting techniques other than that shown are envisioned and within the scope of the claims.

The present invention has been described in terms of the preferred embodiment, and it is recognized that equivalents, alternatives, and modifications, aside from those expressly stated, are possible and within the scope of the appending claims.

What is claimed is:

1. A welding-type system comprising:
   a plasma torch controlled by a trigger and constructed to generate an arc;
   an air supply connected to deliver an air flow to the plasma torch; and
   a controller configured to control the air supply, monitor actuation of the trigger, and continuously monitor for arc outage, and if arc outage is detected while the trigger is actuated, cause (1) continued air flow through the plasma torch for a predetermined period and (2) then regenerate a pilot arc in the plasma torch.

2. The welding-type system of claim 1 wherein the predetermined period is approximately half a second.

3. The welding-type system of claim 1 wherein the controller is integrated into at least one of the plasma torch and a power source configured to generate a welding-type power.

4. The welding-type system of claim 1 wherein the predetermined period is further defined as a duration adequate to cool a consumable of the plasma torch.

5. The welding-type system of claim 4 wherein the consumable is further defined as an electrode and the duration adequate to cool a consumable is further defined as the time required to solidify a liquefied portion of an insert of the electrode.

6. The welding-type system of claim 1 wherein the controller is further configured to automatically set the plasma torch to operate in at least one of an expanded metal mode or a non-expanded metal mode.

7. The welding-type system of claim 6 wherein the controller is configured to determine an operating mode of the plasma torch from at least one of a desired plasma cutting amperage and a duration of a cutting arc.

8. A plasma cutting system comprising:
   a power source constructed to generate a plasma cutting power;
   a plasma torch actuated by a trigger and connected to the power source; and
   a controller configured to control the plasma torch to generate a first arc upon actuation of the trigger and generate a second arc after extinction of the first arc when the trigger remains actuated but only after an insert of an electrode of the plasma torch cools to solidify a portion of the insert that liquefies during operation.

9. The plasma cutting system of claim 8 wherein the insert is one of hafnium and zirconium.

10. The plasma cutting system of claim 8 wherein the plasma cutting system further comprises an air source controlled by the controller to maintain a flow of cooling gas to an anodic element and a cathodic element until the portion of the insert liquefied during operation solidifies.

11. The plasma cutting system of claim 8 wherein the controller is further configured to control at least one of the first arc and the second arc to repeatedly convert between a pilot arc state to a cutting arc state if the cutting arc state is maintained for less than a selected duration.

12. The plasma cutting system of claim 8 wherein the controller is attached to at least one of the plasma torch, the power source, and a connection connecting the plasma torch and the power source.

13. The plasma cutting system of claim 8 wherein the controller is configured to initiate a pilot circuit constructed to provide a pilot current if the first arc approaches a collapse before the first arc has established a cutting arc for a selected duration.

14. A controller of a plasma torch system configured to:
monitor a condition of an arc of a plasma torch;
allow the arc to collapse;
if the arc collapses and a trigger of the plasma torch system remains activated, initiate a delay prior to automatic generation of a subsequent arc;
establish the subsequent arc as at least one of a pilot arc and a cutting arc; and
convert the subsequent arc between the pilot arc and the cutting arc during a single actuation of the trigger of the plasma torch.

15. The controller of claim 14 wherein the plasma torch further comprises an electrode having an insert positioned therein and the delay is sufficient to allow solidification of a portion of the insert liquefied during a plasma cutting process.

16. The controller of claim 14 wherein the controller is further configured to allow at least one of the arc and the subsequent arc to collapse when a cut is complete if the arc or the subsequent arc is maintained as a cutting arc for a selected duration and to allow the cutting arc to convert to a pilot arc if the arc or the subsequent arc is not maintained as a cutting arc for the selected duration.

17. The controller of claim 14 wherein the controller is attached to at least one of the plasma torch, a power source constructed to generate a plasma cutting power, and a connection cable connecting the plasma torch and the power source.

18. The controller of claim 14 wherein the controller is further configured to maintain an air flow through the plasma torch for a duration of the delay.

19. The controller of claim 18 wherein the air flow through the plasma torch maintains a separated condition of a cathodic component and an anodic component of the plasma torch.

* * * * *